(12) United States Patent
Clayman

(10) Patent No.: US 12,347,301 B1
(45) Date of Patent: Jul. 1, 2025

(54) CONSENT MANAGEMENT SYSTEM OVER A COMMUNICATIONS NETWORK

(71) Applicant: David Morris Clayman, Boca Raton, FL (US)

(72) Inventor: David Morris Clayman, Boca Raton, FL (US)

( * ) Notice: Subject to any disclaimer, the term of this patent is extended or adjusted under 35 U.S.C. 154(b) by 0 days.

(21) Appl. No.: 19/061,480

(22) Filed: Feb. 24, 2025

(51) Int. Cl.
  *G08B 27/00* (2006.01)
  *G08B 25/01* (2006.01)
  *H04M 3/51* (2006.01)

(52) U.S. Cl.
  CPC ......... *G08B 27/001* (2013.01); *G08B 25/014* (2013.01); *H04M 3/5116* (2013.01)

(58) Field of Classification Search
  CPC .................................................. G08B 27/001
  See application file for complete search history.

(56) References Cited

U.S. PATENT DOCUMENTS

| 9,934,544 B1 * | 4/2018 | Whitfield | G06Q 50/265 |
| 10,761,084 B1 * | 9/2020 | Lantz | G06Q 50/265 |
| 2016/0042481 A1 * | 2/2016 | Williams | G06Q 50/01 705/311 |
| 2017/0053364 A1 * | 2/2017 | Mark | H04L 51/08 |
| 2017/0132738 A1 * | 5/2017 | Geller | G06F 16/2358 |
| 2020/0051189 A1 * | 2/2020 | Williams | H04L 67/535 |
| 2020/0202454 A1 * | 6/2020 | Joshua | G06Q 50/01 |
| 2022/0156864 A1 * | 5/2022 | Furman | G06Q 50/265 |
| 2023/0113982 A1 * | 4/2023 | Clarke | H04W 4/21 707/706 |
| 2024/0038222 A1 * | 2/2024 | Chaar | G06Q 10/1095 |

* cited by examiner

*Primary Examiner* — Travis R Hunnings
(74) *Attorney, Agent, or Firm* — Mark Terry

(57) ABSTRACT

A system for managing consent over a communications network includes a web server application having a consent scoring module for calculating a dynamic consent score based on received data, a consent monitoring module, a communications link between the web server application and an emergency dispatch center via the communications network, an emergency response mechanism for initiating a call to the emergency dispatch center, and, a cryptographic storage module configured to generate and store tamper-resistant records of consent-related data, including pre-interaction checklist responses, real-time verbal commands, and post-interaction feedback, using cryptographic hashing to ensure data integrity and confidentiality.

20 Claims, 6 Drawing Sheets

CONSENT MANAGEMENT SYSTEM OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of consent management systems and methods and, more specifically, the claimed subject matter relates to the field of systems that facilitate secure and verifiable consent during interpersonal interactions.

BACKGROUND

A consent management system is a platform designed to facilitate the collection, verification, and management of consent between parties during various types of interactions. It ensures that all parties involved clearly communicate and document their intentions, boundaries, and agreements. In the current state of the art, systems designed for managing and verifying consent in interpersonal interactions are limited in their ability to ensure both real-time accountability and post-interaction transparency. While various communication and tracking tools exist, these systems often lack the integration of advanced technologies such as biometric authentication, real-time natural language processing, and secure data storage methods, leaving significant gaps in reliability, privacy, and user experience.

Existing consent management systems rely on static agreements or text-based checklists, which fail to adapt dynamically to the evolving context of an interaction. These systems are often unable to provide real-time feedback or verification, leaving users without immediate safeguards against boundary violations and updated real-time consent grading updates based on verbal or tactile feedback during their sexual encounters. Additionally, they do not effectively address post-interaction scenarios, such as providing tools for users to reflect on their experience, report issues, or connect with others who may have encountered similar concerns.

Privacy and security are also major concerns in the existing solutions. Current approaches frequently store consent data in ways that are susceptible to tampering, misuse, or unauthorized access, undermining user trust. Furthermore, these systems typically lack robust mechanisms for ensuring that consent records can be cryptographically verified, making it difficult to validate claims or provide evidence in disputes.

Another limitation in the current art is the absence of advanced emergency response capabilities. Conventional systems often fail to provide automated, context-aware responses that prioritize critical information such as geolocation and user-specific signals and coach users through how to interact or separate in support of, while awaiting, or instead of any immediate human emergency response. This lack of functionality delays response times and reduces the effectiveness of interventions.

Therefore, what is needed is a system and method for improving the problems with the prior art, and more particularly for a more expedient and efficient method and system for facilitating the management, verification, collection and cancellation of consent between parties.

BRIEF SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for managing consent over a communications network is disclosed. The consent management system for facilitating sexual interactions includes a web server application executing on a web server configured to communicate with a first and a second user device via a connected communications network, the web server application comprising a consent scoring module configured to receive and process data from the first and second user devices via the communications network, including responses from the first and second user devices to a pre-interaction checklist, real-time verbal commands detected on the first and second user devices, and post-interaction feedback submitted via the first and second user devices, the consent scoring module further configured to calculate a dynamic consent score based on the received data, update the consent score continuously, and transmit instructions to the first and second user devices via the communications network to adjust system behavior during and after interactions, a consent monitoring module configured to receive real-time verbal command data from the first and second user devices via the communications network, process the data to detect predefined stop words and go words, and transmit dynamic feedback instructions to the first and second user devices via the communications network to affirm ongoing consent or signal cessation of consent, a communications link comprising a continuously active socket connection between the web server application and an emergency dispatch center via the communications network, wherein the communications link is configured to maintain an open and persistent connection to the emergency dispatch center to enable immediate data transmission, an emergency response mechanism configured to receive biometric distress signals and stop word data from the first and second user devices via the communications network, and upon detection of an emergency, initiate a call to the emergency dispatch center via the connection, and transmit relevant emergency information, including geolocation data and incident details, to the emergency dispatch center through the connection to facilitate a timely and measured response, and, a cryptographic storage module configured to generate and store tamper-resistant records of consent-related data, including pre-interaction checklist responses, real-time verbal commands, and post-interaction feedback, using cryptographic hashing to ensure data integrity and confidentiality.

In another embodiment, the consent management system for facilitating sexual interactions includes a web server application executing on a web server configured to communicate with a first and a second user device via a connected communications network, the web server application comprising a biometric authentication module configured to receive and process biometric data from the first and second user devices to confirm the identity and voluntary engagement of each user, link the first and second user devices, and generate a secure record of initial consent that is cryptographically verifiable and tamper-resistant, a consent scoring module configured to receive and process data from the first and second user devices via the communications network, including responses from the first and second user devices to a pre-interaction checklist, real-time verbal commands detected on the first and second user devices, and post-interaction feedback submitted via the first and second user devices, the consent scoring module further configured to calculate a dynamic consent score based on the received data, update the consent score continuously, and transmit instructions to the first and second user devices via the communications network to adjust system behavior during and after interactions, a consent monitoring module configured to receive real-time verbal command data from the first and second user devices via the communications network, process the data to detect predefined stop words and go words, and transmit dynamic feedback instructions to the first and second user devices via the communications network to affirm ongoing consent or signal cessation of consent, a communications link provided by a third-party service accessible via the communications network, the communications link comprising a continuously active socket connection to an emergency dispatch center via the communications network, wherein the communications link is configured to maintain an open and persistent connection to the emergency dispatch center to enable immediate data transmission, an emergency response mechanism configured to receive biometric distress signals and stop word data from the first and second user devices via the communications network, and upon detection of an emergency, initiate a call to the emergency dispatch center via the connection, and transmit relevant emergency information, including geolocation data and incident details, to the emergency dispatch center through the connection to facilitate a timely and measured response, and, a cryptographic storage module configured to generate and store tamper-resistant records of consent-related data, including pre-interaction checklist responses, real-time verbal commands, and post-interaction feedback, using cryptographic hashing to ensure data integrity and confidentiality In another embodiment, the consent management system for facilitating sexual interactions includes a web server application executing on a web server configured to communicate with a first and a second user device via a connected communications network, the web server application comprising a biometric authentication module configured to receive and process biometric data from the first and second user devices to confirm the identity and voluntary engagement of each user, link the first and second user devices, and generate a secure record of initial consent that is cryptographically verifiable and tamper-resistant, a consent customization module configured to receive user input from the first and second user devices to select consent interaction modes, including a quick consent mode, a healthy consent mode and a private practice mode, the consent customization module further configured to adjust the functionality and data collection of the system based on the selected mode and transmit corresponding instructions to the first and second user devices, a consent scoring module configured to receive and process data from the first and second user devices via the communications network, including responses from the first and second user devices to a pre-interaction checklist, real-time verbal commands detected on the first and second user devices, and post-interaction feedback submitted via the first and second user devices, the consent scoring module further configured to calculate a dynamic consent score based on the received data, update the consent score continuously, and transmit instructions to the first and second user devices via the communications network to adjust system behavior during and after interactions, a consent monitoring module configured to receive real-time verbal command data from the first and second user devices via the communications network, process the data to detect predefined stop words and go words, and transmit dynamic feedback instructions to the first and second user devices via the communications network to affirm ongoing consent or signal cessation of consent, a communications link comprising a continuously active socket connection between the web server application and an emergency dispatch center via the communications network, wherein the communications link is configured to maintain an open and persistent connection to the emergency dispatch center to enable immediate data transmission, an emergency response mechanism configured to receive biometric distress signals and stop word data from the first and second user devices via the communications network, and upon detection of an emergency, initiate a call to the emergency dispatch center via the connection, and transmit relevant emergency information, including geolocation data and incident details, to the emergency dispatch center through the connection to facilitate a timely and measured response, and, a cryptographic storage module configured to generate and store tamper-resistant records of consent-related data, including pre-interaction checklist responses, real-time verbal commands, and post-interaction feedback, using cryptographic hashing to ensure data integrity and confidentiality.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL
VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
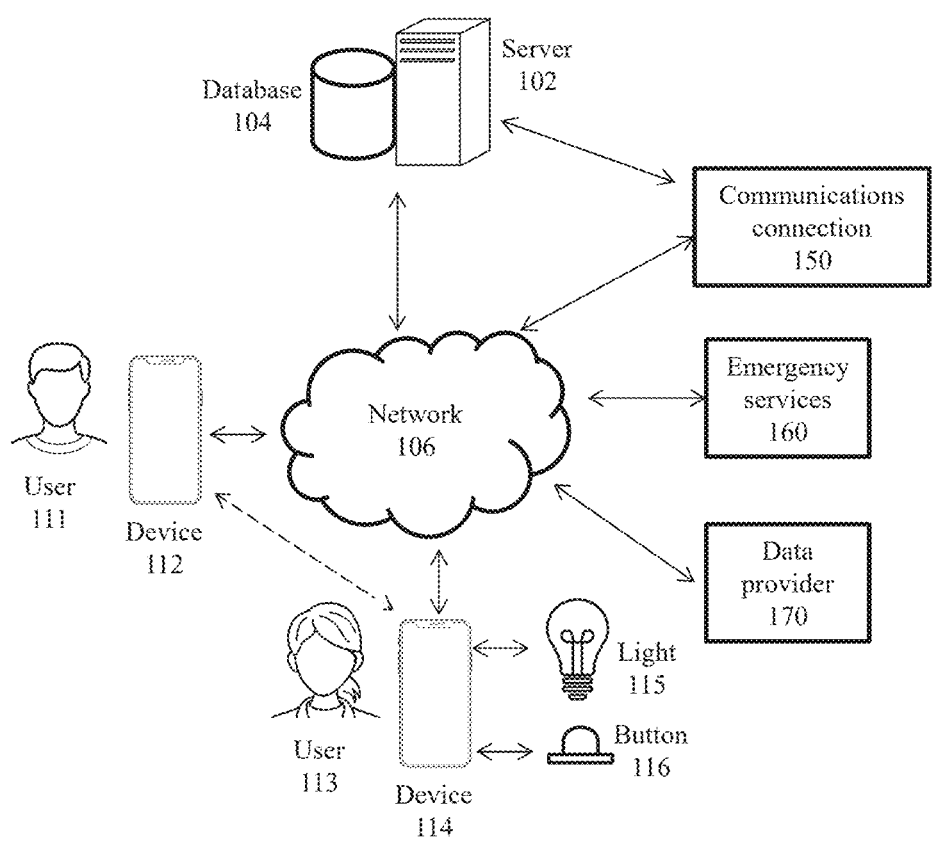
FIG. 1 is a block diagram illustrating the network architecture of a system for managing consent over a communications network, in accordance with one embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The claimed embodiments of the consent management system represent a significant improvement over prior art by integrating advanced technologies and addressing critical limitations in existing systems for managing and verifying consent during interpersonal interactions. Traditional consent systems typically rely on static agreements or text-based checklists that fail to adapt dynamically to the evolving context of an interaction. These systems often lack real-time monitoring, secure authentication mechanisms, and effective post-interaction feedback, leaving users vulnerable to boundary violations, miscommunications, and privacy breaches. The claimed embodiments overcome these shortcomings by employing a dynamic consent scoring mechanism that calculates a real-time metric based on pre-interaction inputs, real-time verbal commands, and post-interaction feedback. This dynamic scoring provides a continuously updated assessment of consent, enabling immediate adjustments to the system's behavior based on changing circumstances and motivating all consenting parties to be and remain on their very best behavior. This approach ensures that the system is not merely a passive tool but an active participant in maintaining and motivating ever better and more perfect consent, offering a degree of responsiveness and reliability that prior art cannot achieve.

Additionally, the claimed embodiments incorporate biometric authentication on linked user devices to confirm the identity and voluntary engagement of both parties. By generating cryptographically verifiable records of consent, the system ensures data integrity and provides a secure foundation for resolving disputes or validating consent. This feature addresses a significant gap in prior systems, which often lack robust security measures, leading to potential misuse or unauthorized access to sensitive information. Another advantage of the claimed embodiments is its modularity and customization, allowing users to choose between consent interaction modes, such as "Quick Consent" or "Healthy Consent" or "Private Practice," each tailored to different preferences and interaction contexts. This feature enhances user satisfaction and adaptability, enabling the system to accommodate a wide range of interpersonal dynamics while maintaining a high standard of safety and accountability.

Furthermore, the emergency response mechanism in the claimed system is a novel and critical improvement. By leveraging real-time detection of verbal stop words and biometric distress signals, the system can autonomously trigger ongoing consent grade updates to promote better participant self-regulation and prevention, enable wellness checks and prioritize emergency services based on geolocation data. This automated, context-aware approach ensures a timely and effective response to critical situations, reducing harm and enhancing user trust.

Users can establish in their user profile data whether they wish to have physical or digital help getting extracted from an emergency situation or not, and whether they want in a "Mayday, Mayday" emergency situation audiovisual escape coaching and emergency alert support through their device (s) or whether they want this consent system to act and operate as a silent alarm when emergency services are notified of a consent emergency, an option that is only practically available when location is clearly and specifically known and location disambiguation is not deferred. Some users have a strong credible fear that the persons they may be in a sexual encounter with would act aggressively if they are trapped for a brief time alone in a room with a physically imposing alleged perpetrator who they are in the process of openly reporting and therefore prefer a discreet silent alarm over immediate escape coaching, and some prefer self-reliant de-escalation in an emergency over more forceful external emergency services extraction and de-escalation support. Other users want the support of an external authority amplifying their voice, talking both parties through a complex situation, and helping remind both parties to follow protocol in separating rapidly and civilly with rapid dressing, rapid return to an unaroused state, and maximal de-escalation. This takes the form of a device-triggered (by button press or safe word) and device-triggering device-supported language-specific coached and sloganed (ex: "Mayday, Say Nay, Walk Away") muscle memory protocol for interpersonal separation similar to the ubiquitous childhood fire safety emergency readiness practice drills of "Stop, Drop, and Roll", helping a discordant couple separate quickly, safely, and civilly with device support. This automated, context-aware approach ensures a timely and effective coordinated, choreographed response to critical situations, sensitive to user privacy and security preferences, facilitating and supported closely by user actions, reducing harm and enhancing user trust. This context-aware approach furthermore provides a range of assistive emergency response options the user can select between based on whether the user anticipates escaping under stress with any mixture of (a) flight, (b) fight, (c) freeze, or (d) fawn.

Referring now to the drawing figures in which like reference designators refer to like elements, there is shown in FIG. 1 an illustration of a block diagram showing the network architecture of a system 100 and method for managing consent over a communications network in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, a satellite communications network, or any combination of the above. Server 102 is a central controller or operator for functionality of the disclosed embodiments, namely, facilitating consent management activities between users.

FIG. 1 includes mobile computing devices 112, 114, which may be smart phones, mobile phones, tablet computers, handheld computers, wearable computers, device-paired or independently networked smartwatches, laptops, or the like. In another embodiment, mobile computing devices 112, 114, are workstations, desktop computers, servers, laptops, all-in-one computers, or the like. In another embodiment, mobile computing devices 112, 114, are AR or VR systems that may include display screens, headsets, heads up displays, helmet mounted display screens, tracking devices, or the like. FIG. 1 also shows a server, computer, or mobile computing device 160, 170, which correspond to an emergency services provider and a data provider. Devices 112, 114, 160, 170 may be communicatively coupled with network 106 in a wired or wireless fashion. Augmented reality (AR) adds digital elements to a live view often by using a camera on a computing device. Virtual reality (VR) is a complete or near complete immersion experience that replaces the physical world.

FIG. 1 further shows that server 102 includes a database or repository 104, which may be a relational database comprising a Structured Query Language (SQL) or NoSQL database. Devices 112, 114, 160, 170 may also each include their own database. The repository 104 serves data from a database, which is a repository for data used by server 102 and devices 112, 114, 160, 170 during the course of operation of the disclosed embodiments. Database 104 may be distributed over one or more nodes or locations that are connected via network 106.

The communications link is engineered to maintain an open and persistent connection, ensuring immediate and reliable data transmission in the event of an emergency. This design overcomes delays typically associated with establishing ad hoc connections during critical situations, providing users with a faster and more dependable response mechanism. The socket connection is implemented using industry-standard communication protocols, such as TCP/IP or WebSockets, to support bidirectional, low-latency data transfer. The persistent nature of the connection ensures that the server 102 can transmit critical information—such as geolocation data, user identifiers, and the nature of the emergency—to the emergency services center 160 without delay. Additionally, the connection includes redundancy and failover mechanisms to practically guarantee virtually 100% uptime. For instance, if the primary socket experiences a failure, the system automatically reroutes communication to a secondary link or provider.

The communications link 150 may utilize a third-party service provider specializing in emergency communication infrastructure. This provider acts as an intermediary with authorized and secure access to emergency services centers, including local 911 services in the geographic areas of the users 111 and 113. The integration with such a service provider offers several engineering and practical advantages. By leveraging the provider's established infrastructure, the system ensures compliance with regional and national regulations governing access to emergency services. Furthermore, the provider's expertise in emergency communication ensures robust handling of sensitive data and coordination with local dispatch centers.

For users, this architecture translates to enhanced safety. In the event that the emergency response mechanism of the consent management system detects a critical situation—such as a verbal stop word combined with a biometric distress signal—the server 102 will immediately activate the communications link 150. Within milliseconds, essential data such as the user's geolocation and a summary of the detected incident are transmitted to emergency services center 160. This rapid response capability minimizes delays in emergency intervention, which can be critical for preserving the safety and well-being of the users. The inclusion of a continuously active connection also allows for proactive monitoring and health checks of the communication link itself. Regular pings between server 102 and provider 150 ensure the integrity of the connection and allow for real-time diagnostics in the rare case of connectivity issues.

FIG. 1 further shows that smart light bulb 115 can be connected to a user device. A connected smart lightbulb is a network-enabled lighting device that integrates with user devices and the local wireless access point (WAP) to provide dynamic and programmable functionality. In the context of the consent management system, the smart bulb acts as a visual indicator by changing color and luminosity to reflect the current consent status. The bulb receives real-time signals from user devices or the centralized server 102, which process consent data such as verbal commands, biometric inputs, or dynamic consent scores. For example, the bulb might display green to indicate mutual consent, pulsing yellow to signal caution, a boundary adjustment, or any cautionary grade change, and flashes of red to denote an unacceptably poor grade, a withdrawal of consent, or an emergency. Connected through the WAP, the lightbulb ensures seamless communication with user devices and operates as an unobtrusive yet effective tool for enhancing awareness and accountability in shared spaces. By integrating this visual feedback mechanism, the system provides an additional layer of clarity and reassurance, promoting safe and consensual interactions.

FIG. 1 further shows that smart button 116 can be connected to a user device. A connected smart button is a network-enabled button that integrates with user devices and the local wireless access point (WAP) to provide immediate push button functionality. In the context of the consent management system, the smart button can be pressed by any participant if there is an immediate retraction of consent. The button can send real-time signals to user devices or the centralized server 102, which processes said retraction of consent and adjusts dynamic consent scores accordingly.

The database 104 may include a user record for each user 111 or 113. A user record may include: contact/identifying information for the user (name, address, telephone number (s), email address, etc.), information pertaining to friends or partners associated with the user, contact/identifying information for friends or partners of the user, health, security, privacy, and consent preferences for the user, electronic payment information for the user, sales transaction data associated with the user, etc. A user record may also include a unique identifier for each user, a residential address for each user, the current location of each user (based on location-based services from the user's mobile computer) and a description of past friends or partners of each user. A user record may further include demographic data for each user, such as age, sex, income data, race, color, marital status, etc.

Sales transaction data may include one or more service identifiers (such as SKUs), one or more service amounts, buyer contact/identifying information, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

The database 104 may include an interaction record for each interaction in which a user is involved. An interaction record may include identifiers for each user involved, consent mode status for the interaction, consent data collected before, during and after the interaction, any relevant scores calculated for the interaction, and the like.

FIG. 1 shows an embodiment wherein networked computing devices 112, 114, 160, 170 interact with server 102 and repository 104 over the network 106. It should be noted that although FIG. 1 shows only the networked computers 112, 114, 160, 170 and 102, the system of the disclosed embodiments supports any number of networked computing devices connected via network 106. Further, server 102, and units 112, 114, 160, 170 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 112, 114, 160, 170. Further, server 102 and its functionality, according to a preferred embodiment, can be realized in a centralized fashion in one computer system or in a distributed fashion wherein different elements are spread across several interconnected computer systems.

FIG. 1 also shows an emergency services provider 160. Server 102 may interface with emergency services provider 160 during the course of operation. An emergency services provider is an organization or entity responsible for responding to urgent and potentially life-threatening situations to ensure public safety and provide critical assistance. These providers include entities such as relationship and sexual consent counseling centers, police departments, fire departments, ambulance services, and specialized disaster response teams. Emergency services providers are equipped to handle a wide range of scenarios, including medical emergencies, natural disasters, fires, accidents, and security threats. They operate through highly trained personnel, advanced communication systems, and specialized equipment to assess situations, deploy appropriate resources, and deliver timely interventions. Many emergency services providers maintain 24/7 operations and rely on rapid-response communication channels, such as 911 dispatch centers, to coordinate and prioritize incidents. Their primary goal is to minimize harm, protect lives and property, and ensure community safety in times of crisis.

FIG. 1 also shows a data provider 170. Server 102 may interface with data provider 170 during the course of operation. A data provider is an entity or system that collects, processes, and supplies specific types of information to authorized users or applications. In the context of sexual health, a data provider may securely manage and deliver user-specific information, such as sexually transmitted disease (STD) test results, vaccination records, or other relevant health data. This information is often obtained from certified medical laboratories, healthcare providers, or user inputs and is stored in compliance with strict privacy and security standards to protect sensitive information. A data provider facilitates the secure sharing of this data with consent management systems or other authorized parties, enabling users to transparently disclose their sexual health status as part of establishing trust and accountability in interpersonal interactions.

The consent management system integrates seamlessly with third-party service providers to enhance its functionality, including relationship and sexual consent counseling centers, emergency dispatch services and sexual health data providers. Third-party emergency dispatch providers act as intermediaries with authorized access to 911 services and local emergency response centers. These providers maintain robust communication infrastructure, ensuring compliance with regional and national regulations while providing high availability and low latency for emergency communications. The system leverages these providers via the communications link to transmit critical data, such as geolocation, user identifiers, and emergency details.

For sexual health data, the system interfaces with certified data providers to securely retrieve and store user-specific information, such as STD test results and vaccination records, as well as community information like active community sexual health campaigns to control the community spread of communicable or sexually-transmitted disease. Users authorize the retrieval of this data during enrollment or interaction setup, and the system encrypts the data using industry-standard cryptographic techniques before storing it in the database. This integration ensures that health-related disclosures are accurate, verifiable, and accessible only to authorized users, fostering trust and transparency in interpersonal interactions.

Figure 2:
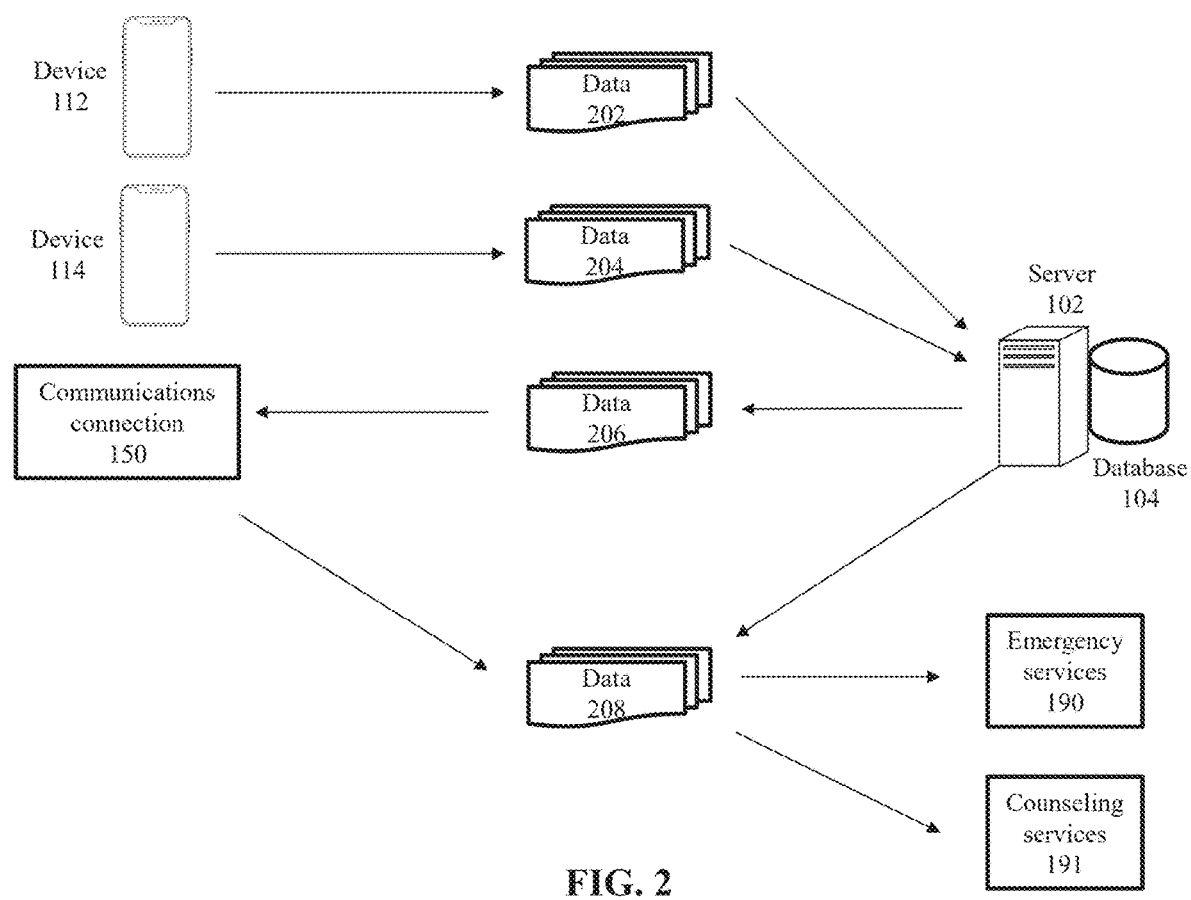
FIG. 2 is a block diagram showing the data flow of the process for managing consent over a communications network, according to one embodiment.

The process of managing consent over a communications network will now be described with reference to FIGS. 2-3C below. FIGS. 2-3C depict the data flow and control flow of the general process (and sub-processes) for managing consent over a communications network 106, according to one embodiment. In FIGS. 2-3C, any data provided by user 111 via device 112, including consent data, enrollment data, etc. is referred to as data 202, any data provided by user 113 via device 114 is referred to as data 204. Also, any data server 102 provides to emergency services 190 or counseling services 191 via connection 150 is referred to as data 206, while any data server 102 provides directly to emergency services 190 or counseling services 191 is referred to as data 208.

Figure 3A:
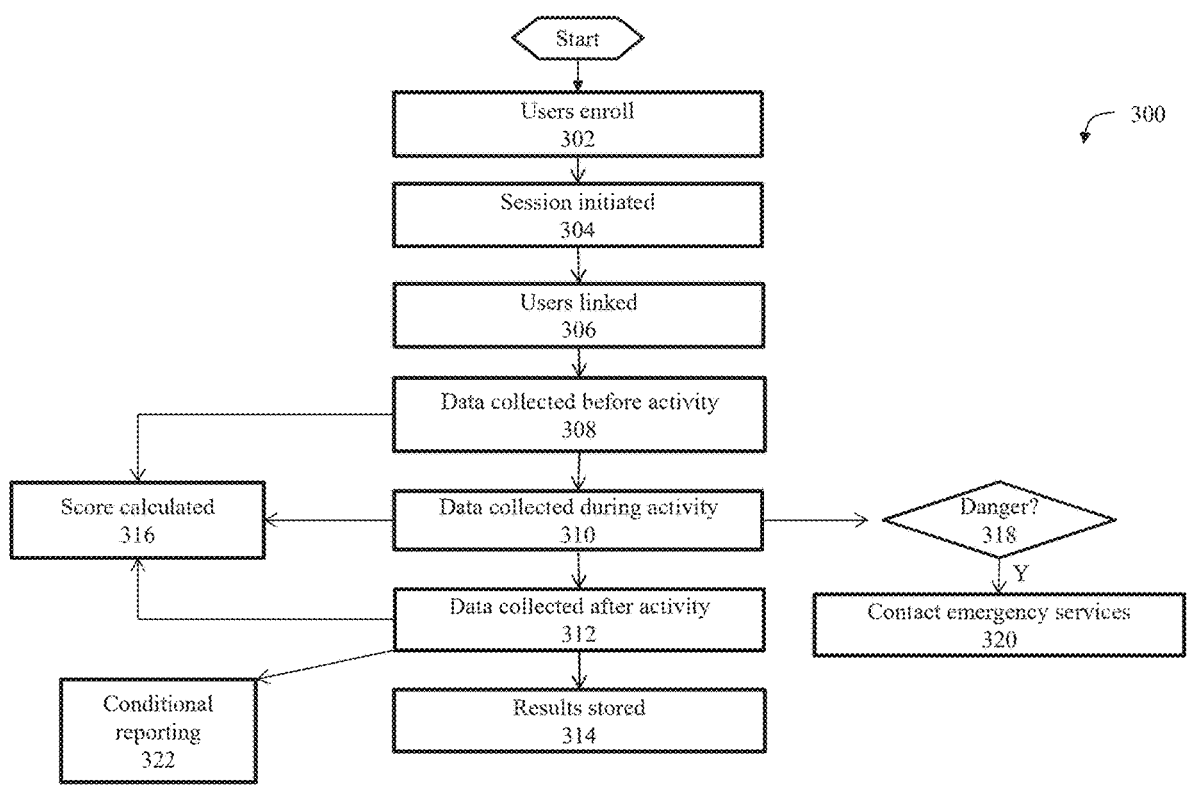
FIG. 3A is a flow chart depicting the general control flow of a process for managing consent over a communications network, according to one embodiment.

FIG. 3A is a flow chart depicting the general control flow of a process for managing consent over a communications network, according to one embodiment. The process of the disclosed embodiments begins in FIG. 3A with optional step 302 (see flowchart 300), wherein the users 111 and 113 may enroll or register with server 102. In the course of enrolling or registering, the users may enter data into their device by manually entering data into a mobile application via keypad, touchpad, or via voice. In the course of enrolling or registering, the users may enter any data that may be stored in a user record, as defined above. Also in the course of enrolling or registering, the server 102 may generate a user record for each registering user and store the user record in an attached database, such as database 104.

Subsequently, in step 304, the users initiate a sexual interaction session, during which the system enables features for dynamic consent tracking. The users may do so by pressing a button or otherwise indicating on a mobile application on the user device that a sexual session is beginning. In step 306, the users are linked using their respective devices via a secure communication protocol, such as Bluetooth or a network-based connection, to synchronize their consent management systems. Linking ensures the system can attribute actions, consent data, and verbal commands to the correct user. Linking may also comprise storing a data structure in the database 104 that indicates a joinder or connection between these two users, by storing their unique identifiers, and related data, such as time, date, consent data, etc.

In step 308, consent data is collected before sexual activity. This involves presenting the users with a pre-interaction checklist through the mobile application, which may include topics such as STD protection, birth control, and specific boundaries. The users' responses and other related data like account linkage, any established user account preferences, and consent mode are processed by the consent scoring module, which calculates an initial consent score. This score serves as a baseline for subsequent updates and system behavior adjustments. Biometric authentication is also performed in this step, where users verify their identities through fingerprint, facial recognition, or other secure means, ensuring the voluntary nature of their engagement.

During step 310, consent data is collected in real time as the sexual activity progresses. The system actively monitors verbal commands such as go words or stop words using a natural language processing (NLP) engine integrated into the users' devices. Phrases may also be used in addition to words. The NLP engine differentiates between consent-related commands and ambient speech, tagging and associating each command with the specific user who issued it. The purpose of this step is to dynamically track and validate consent, adjusting the consent score as needed based on detected actions and commands. If a predefined stop word or biometric distress signal is detected, the system flags the interaction for further analysis and potential intervention.

In step 312, post-interaction consent data is collected. Users provide feedback through the application, indicating the quality of the experience and any potential coercion. This feedback is securely transmitted to server 102, where it is used to update the final consent score. The post-interaction feedback also informs the system's ability to identify patterns and potential risks associated with recurring negative interactions.

In step 314, all data collected during steps 308, 310, and 312 is securely stored in database 104. This storage process utilizes cryptographic techniques to ensure data confidentiality, integrity, and resistance to tampering. The stored data forms an immutable record of the interaction, which can be retrieved for future reference or investigation if required.

Step 316 calculates the consent score in a dynamic fashion as time progresses. This calculation occurs after each data collection step (308, 310, and 312) and combines inputs from the pre-interaction checklist, real-time verbal commands, and post-interaction feedback. The updated consent score reflects the ongoing and retrospective nature of the interaction, allowing the system to adapt dynamically and maintain an accurate representation of mutual agreement. The updated and updating consent score at all times is visually or aurally available to users on their devices to promote active self-regulation and gamified pursuit of higher and higher consent scores rising up into "bonus score" or "ovation" ranges.

In step 318, the system assesses whether danger is present during the interaction. Using data from the NLP engine, biometric distress signals, button taps or presses on a device (see button 116) and environmental metadata such as noise levels or motion, the system determines if an emergency is occurring. This assessment occurs in real time, enabling rapid identification of potentially harmful situations. If danger is detected, step 320 triggers the emergency response mechanism, which establishes a communication link with the appropriate 911 dispatch center. The system transmits relevant emergency data, including geolocation and a summary of the detected issue, to ensure a timely response.

The emergency response mechanism includes a fallback system to ensure that emergency alerts are virtually always delivered, even if the primary communication link with the emergency dispatch center fails. The fallback mechanism is integrated into the emergency response module and configured to send alerts via alternative channels, such as SMS, email, or webhook notifications, to predefined emergency contacts or services. For example, if the socket connection to the emergency dispatch center becomes unavailable, the module automatically generates an alert containing the user's geolocation, consent session data, and a summary of the detected incident. This alert is transmitted to alternative endpoints specified in the user's emergency contact preferences. The system also logs these fallback alerts in the cryptographic storage module to ensure a tamper-resistant record of the event is maintained. By implementing redundancy in emergency communication, the system enhances user safety and ensures a reliable response under all conditions.

Finally, in step 322, conditional reporting occurs. If the consent score indicates negative feedback or if an emergency has been detected, the system offers users the ability to anonymously or semi-anonymously connect with others who have reported similar issues with the same individual. This feature, implemented through a secure and moderated communication platform, facilitates mutual support and resource sharing while safeguarding user privacy. This step enhances the system's ability to address recurring patterns of negative behavior and supports broader efforts to promote accountability and safety in interpersonal interactions.

The consent management system provides a secure and moderated platform for users who have submitted negative post-interaction feedback about the same individual to connect anonymously or semi-anonymously. This platform is implemented as part of the consent-scoring module and operates through encrypted communication channels to protect user identities. When a user submits negative feedback, the system compares the feedback with stored interaction records to identify other users with similar reports. If a match is found, the system notifies the affected users and offers them the option to join an anonymous or semi-anonymous support group moderated by trained professionals or AI-based moderation tools.

The platform enables users to share experiences, access resources, and provide mutual support while adhering to strict privacy policies. For example, users can participate in discussions without revealing personal information, and communication is monitored to minimize the risk of misuse or harassment. This feature not only fosters a sense of community but also aids in identifying patterns of harmful behavior, which can be flagged for further action or investigation.

Figure 3B:
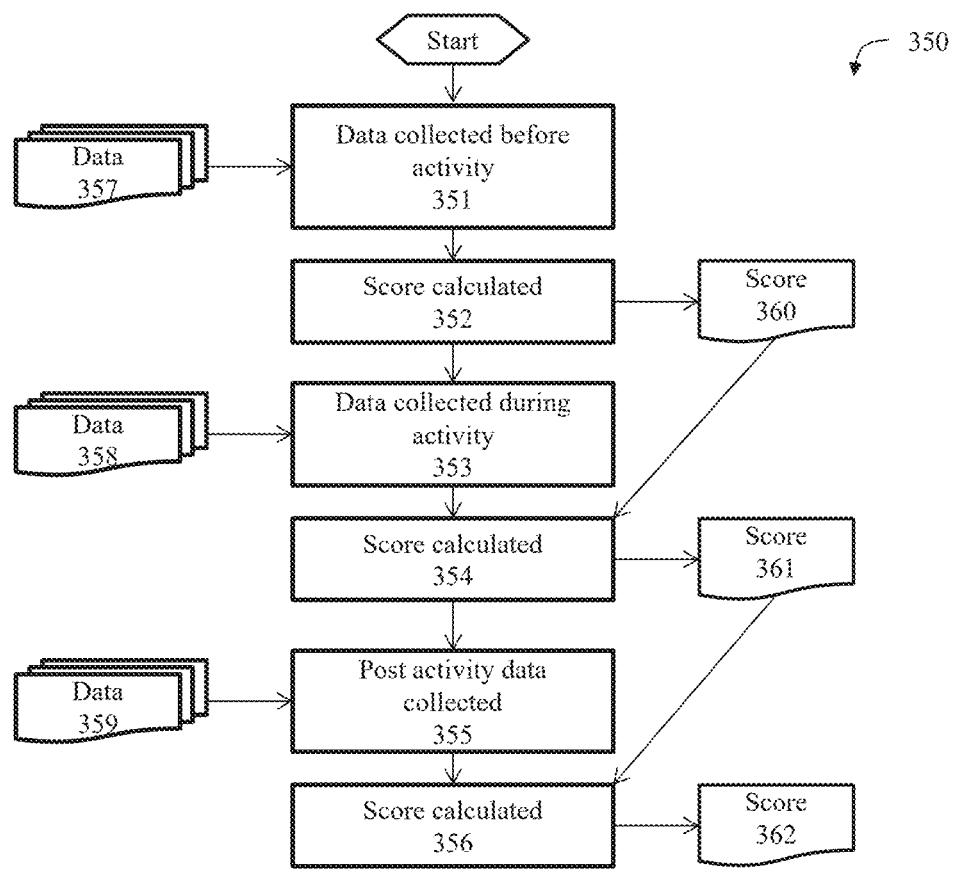
FIG. 3B is a flow chart depicting the specific control flow of the data collection and score calculation process within the process for managing consent over a communications network, according to one embodiment.
Figure 3C:
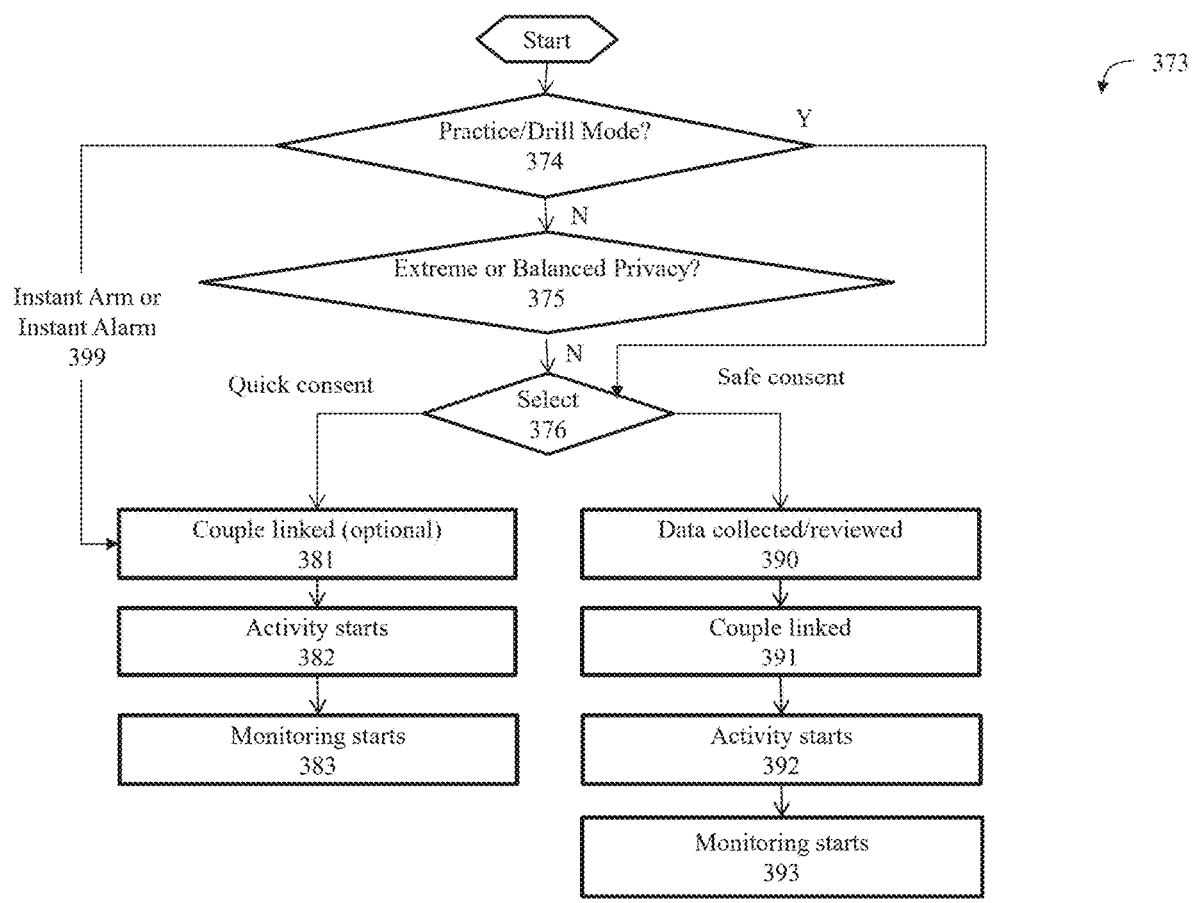
FIG. 3C is a flow chart depicting the specific control flow of the consent mode process within the process for managing consent over a communications network, according to one embodiment.

FIG. 3B is a flow chart depicting the detailed control flow of the data collection and score calculation process within the system for managing consent over a communications network 106, according to one embodiment. The process begins with step 351 (see flowchart 350), where server 102 collects data 357 before the initiation of sexual activity. This pre-interaction data is obtained from the users via a mobile application running on their devices. Users complete a consent checklist that may include topics such as boundary preferences, methods of birth control, STD protection measures, and agreement on safe words. The users' responses are transmitted securely to the server, where they are stored in database 104 using cryptographic hashing to ensure data integrity. Biometric authentication is also performed during this step to verify the identities and voluntary engagement of the users, adding an additional layer of security. The purpose of this step is to establish a foundational dataset for the consent score and ensure mutual agreement before any further actions take place.

In step 352, the server calculates an initial consent score 360 based on the collected pre-interaction data. The score is generated by a consent scoring module that integrates machine learning algorithms to evaluate the checklist responses against predefined scoring criteria. Factors such as the completeness of responses, agreement on key boundaries, and the presence of biometric verification contribute to the calculated score. This initial score serves as a baseline for subsequent updates and determines whether the interaction is ready to proceed.

With regard to the machine learning process, the consent management system employs a machine learning algorithm to dynamically refine consent score calculations based on historical and real-time user data. The machine learning model, implemented as part of the consent scoring module, is trained on a dataset of prior interactions, which includes user responses to pre-interaction checklists, real-time verbal commands, and post-interaction feedback. The algorithm assigns weights to different types of data inputs based on their historical significance in assessing consent, such as prioritizing real-time verbal commands during active interactions. As new data is collected, the model updates dynamically, recalibrating the weights to reflect emerging patterns in user behavior. For example, if a user frequently uses specific go words during interactions, the model adjusts its scoring to prioritize those commands. This adaptive approach ensures that consent scoring remains accurate and context-sensitive, improving the reliability of the system over time.

The process continues to step 353, where data 358 is collected during the sexual activity. This real-time data includes verbal commands, such as go words and stop words, detected by a natural language processing (NLP) engine integrated into the users' devices. Phrases may also be used in addition to words. The NLP engine is designed to differentiate consent-related commands from ambient speech, tagging each command with the identity of the issuing user. Additionally, biometric distress signals, device motion data, and environmental factors such as sound levels may be monitored and transmitted to the server. This data is securely processed to ensure that ongoing consent is dynamically tracked and validated. The purpose of this step is to monitor the interaction in real time, enabling the system to adapt its behavior and detect any deviations from mutual agreement.

In step 354, the server calculates an updated consent score 360 that takes into account the initial score from step 352 and all data collected during the interaction so far. The consent scoring module evaluates changes in the interaction, such as the frequency and type of verbal commands, the presence of distress signals, and deviations from pre-interaction agreements. The score is recalibrated dynamically to reflect the evolving nature of the interaction, providing a continuously updated metric of consent.

The process proceeds to step 355, where data 359 is collected after the interaction concludes. This post-interaction data includes user-submitted feedback on the experience, such as ratings of consent quality, coercion concerns, and overall satisfaction. Users may also provide free-text descriptions of any issues or highlights, which the server analyzes using text processing algorithms. This feedback is securely stored and may also be used to identify patterns of negative behavior or risks associated with specific users.

Finally, in step 356, the server calculates a final consent score 362 by integrating the previously calculated score and all post-interaction data. The final score provides a comprehensive assessment of the interaction, combining pre-interaction agreements, real-time observations, and post-interaction feedback. The purpose of this step is to establish a definitive record of consent, which can be used for reporting, accountability, and future interactions. If the score falls below a predefined threshold, the system may initiate additional actions, such as connecting the user with support resources or flagging patterns for further analysis. By collecting and analyzing data at multiple stages of the interaction, the process depicted in FIG. 3B ensures a robust and dynamic approach to consent management, providing real-time tracking, adaptive scoring, and comprehensive documentation of user interactions.

In one alternative embodiment, the consent management system disclosed herein utilizes a structured scoring methodology to evaluate and track consent over the course of an interaction. This multi-tiered consent scoring model incorporates an Initial Consent Score, a Main Event Score, a Post-Event Score, and a Final Composite Score. Each of these scores are used in evaluating consent throughout different stages of an interaction and in providing data for the users, emergency services, and other parties.

The Initial Consent Score is calculated based on pre-interaction inputs provided by both users, such as responses to a consent checklist, agreement on boundaries, health disclosures, personal preferences and consent mode. This score reflects the degree of initial compatibility and alignment between the users' stated boundaries and expectations. The Initial Consent Score is a joint score, meaning that both users share the same reported value. Even though individual preference matches may be calculated separately, the final reported Initial Consent Score for a given pairing will default to the lower of the two individual scores. For example, if one user has an A− Initial Consent Score and the other user has a B+ Initial Consent Score, the final displayed Initial Consent Score will be B+. This approach ensures that any disparities in stated consent levels are accounted for, and that the system always reflects the minimum shared level of consent preparedness. While the first version of the system will not display individualized consent scores at this stage, there may be background adjustments based on specific factors such as contraception responsibility. If one participant has taken proactive contraceptive measures, such as an intrauterine device (IUD) or another medical form of contraception, but the other has not engaged in any preventative behavior, such as declining to use a condom despite no other form of protection, a background penalty may be applied to the non-protective participant. However, in the initial system release, such adjustments will only be recorded as a background factor rather than modifying the joint Initial Consent Score. Instead, the system may provide feedback messages and improvement suggestions, such as recommending better contraceptive practices.

The Main Event Score measures consent continuity and responsiveness during the interaction itself. It is derived from real-time verbal command monitoring, biometric feedback, environmental conditions, and detected behavioral patterns. The Main Event Score may remain a joint score rather than an individualized score. This means that both users will receive the same Main Event Score, even if individual contributions to that score might differ. Consequently, both participants may receive an adjusted score in response to real-time events. If a stop command is issued and the Main Event Score drops from an A to a B, both users will experience this score adjustment, even if only one party issued the command. The system may attempt post-event inference based on survey responses to distinguish the probable source of consent-related verbal input. Alternatively, differentiated scoring for Main Event Scores through improved natural language processing (NLP) and voice recognition may be used, allowing the system to attribute verbal consent markers and emergency stop commands to individual users. However, even if such differentiation is developed, the Main Event Score may remain a joint score for simplicity and to ensure a fair consent evaluation process.

Unlike the Initial Consent Score and Main Event Score, which are joint scores, the Post-Event Score is individualized. After the interaction, each user submits independent feedback about their experience, rating their own perception of the event and their partner's actions. This feedback is processed to generate separate Post-Event Scores for each participant, ensuring that user-specific experiences are accurately captured. The Post-Event Score serves three critical functions. First, when feedback is positive, it is used to reward and applaud outstanding and enthusiastic consent by any of those involved in a sexual encounter. Second when feedback is negative it informs emergency response triage, as interactions flagged with coercion, discomfort, or boundary violations are prioritized for emergency or counseling review. Emergency responders or counseling professionals use this score to assess the urgency and severity of the situation. Third, it plays a role in long-term consent reputation management, helping to differentiate between individuals who consistently engage in healthy, consensual interactions and those who exhibit problematic behavior. An aspect of the Post-Event Score is its impact on reputation-based features. In cases where one party reports a stop command, emergency, or boundary violation, their own reputation score may also be slightly affected, as reporting an incident itself can influence the perception of the interaction. However, the system accounts for accident forgiveness. If further system data, user history, or additional reports confirm that a particular user was not responsible for a negative experience, adjustments can be made to mitigate unfair penalties on the reporting user's reputation. Conversely, in highly positive experiences where one user expresses significant enthusiasm, such as repeatedly saying "Yes, Yes, Yes!" the shared Main Event Score may be elevated, even though only one user was particularly expressive. In such cases, the Post-Event Score provides a way for the receiving user to clarify their individual perspective, ensuring that consent reputations are not artificially inflated or misrepresented.

The Final Composite Score represents a weighted combination of the Initial Consent Score, the Main Event Score, and the Post-Event Score. This final score serves as a summary metric when a simplified score is needed for reporting or averaging. The algorithm for calculating the Final Composite Score may evolve over time but ensures that it does not misrepresent a user's overall consent behavior. The Final Composite Score is never solely dictated by the highest or lowest individual score component. While severe violations may floor the Final Composite Score to the lowest recorded score component, typical interactions will result in a blended score. The system adapts the weight of each score component based on contextual factors, such as repeated patterns of positive or negative behavior, emergency override conditions, and aggregated user history.

This scoring methodology integrates with features of the consent management system, including real-time consent monitoring, where verbal commands and biometric inputs influence Main Event Scores, emergency response systems, which rely on Post-Event Scores for prioritization, and reputation-based features, supporting fair, gradual reputation adjustments rather than instantaneous draconian punitive measures. Additionally, this scoring methodology anticipates future advancements in NLP and voice attribution, enabling more refined differentiation of individual contributions to consent scoring.

FIG. 3C is a flow chart depicting the specific control flow of the consent mode process within the system for managing consent over a communications network 106, according to one embodiment. The process begins with steps 374-376 (see flowchart 373), where server 102 determines whether the users have collectively selected the "Quick Consent Mode" or the "Safe/Healthy Consent Mode" in combination with the "Practice/Drill Mode" or "Maximum Privacy" using their respective user devices. This selection is facilitated through the mobile application interface, where users are presented with the options for consent modes. The purpose of this step is to allow users to customize the level of consent engagement according to their preferences and the context of their interaction. The server processes the selections from both users, ensuring mutual agreement on the chosen mode before proceeding.

If Quick Consent Mode is selected, the process advances to optional step 381, where the users are linked via their devices using a secure communication protocol, such as Bluetooth or a network-based handshake. This step synchronizes the consent management systems of both users and establishes a shared communication channel for real-time monitoring and feedback. Once the users are successfully linked, the process continues to step 382, where the sexual activity is initiated. At this point, the server records the initiation and begins basic tracking of the interaction. In step 383, monitoring starts, utilizing the consent monitoring module to detect predefined verbal commands (e.g., go words and stop words) and collect minimal real-time data. The Quick Consent Mode is designed to provide rapid setup and minimal friction, offering a streamlined approach for users who prioritize speed while still maintaining essential safeguards.

In one embodiment, steps 374-376 may be bypassed, and control flow may move directly to step 381, if Instant Arm mode or Instant Alarm mode (via the use of a wake word or the press of a button 116) is used. This is a fallback safety measure in case the users do not activate one of the other modes, such as Healthy Consent or Quick Consent. This feature may be used in cases wherein consent cannot be established or known by the device with any clarity, and wherein acceptance of sexual activity may have the character of acquiescence to an aggressor rather than any form of true consent (let alone enthusiastic consent in the Quick Consent or Healthy Consent modes). By using a wake word or pressing button 116, the Instant Arm mode or Instant Alarm mode is triggered and control flow may move directly to step 381.

If Safe/Healthy Consent Mode is selected, the process proceeds to step 390, where the system collects detailed pre-interaction data from the users. This data includes responses to a consent checklist, boundary descriptions, and agreements on safe words. The users are required to authenticate their identities using biometric methods, such as fingerprint or facial recognition, to confirm voluntary participation. The collected data is reviewed by the server, which ensures that all required fields are completed and aligns the responses for compatibility between the users. The purpose of this step is to establish a comprehensive understanding of the users' preferences and boundaries before proceeding.

There is a Practice/Drill mode 374 and a Maximum Privacy mode 375. In Practice/Drill mode 374, users can experiment and play with the system without sending consent records or emergency support requests through the network 106, and unless they switch to another mode nearly all data will be processed on their devices 112 or 114 with the help of a database and scoring system local to their devices. Very minimal data may be shared with the server 106 in Practice/Drill mode, with that minimal data meant to signal for competency and readiness training purposes that Private Practice mode has been engaged and completed successfully without related consent scoring records or emergency support calls being relayed beyond the provision of mock experiences. In Practice mode users will be able to practice-drill while their privacy is maximally protected. Practice mode can not only be used for new user orientation and periodic practice-drills but can also be used by exceptionally privacy-conscious users who want locally monitored and device-supported sexual experience safety, grading, and device refereeing but don't, for whatever reason, trust any data exchange with network 106 or server 102 or any emergency partners with consent, relationship, and sexual health information they consider too exceptionally private and sensitive to ever share for non-local processing or storage.

This device system will periodically send sponsored incentives like financial discounts on service costs or participation rewards (monetary or non-monetary) if users utilize Practice mode consistently to stay "up to code" and behave with consistently good bedside manner in their other comprehensive interactions with this system in other modes.

In Extreme Privacy mode 375, users express a preference for local device processing and database storage as much as possible, even if it comes with a tradeoff of increased server system uncertainty over users' past sexual experiences and past consent records using this system. Users must agree on whether to use Extreme Privacy mode 375 or whether to choose the recommended default Balanced Privacy 375 and accountability with comprehensive server consent data record exchange instead. If the users agree on Extreme Privacy in step 375, the system will minimize data transit through network 106 and use direct device linkage instead when data exchange between device 112 and device 114 is necessary. If the users select Balanced Privacy mode, data exchange between devices will run principally or exclusively through network 106 with the support of server 102 and database 104.

Following the data collection and review in step 390, the process advances to step 391, where the users are linked via their devices. This linking process not only synchronizes the consent management systems but also validates that both users have completed the necessary steps for Safe/Healthy Consent Mode. When the linkage is in Balanced Privacy mode, the server verifies the linking process by cross-referencing user records and ensuring that the selected consent mode aligns with the system's requirements. When the linkage is in Extreme Privacy mode, the linkage is direct device-to-device through a device data communication linkage already well-known in the prior art (ex: Bluetooth, QR code linkage support) and the devices themselves manage the linkage verification steps. Once the linking is complete, the process moves to step 392, where sexual activity is initiated. This initiation is accompanied by confirmation prompts and optional feedback from the users, ensuring mutual readiness.

Before monitoring starts in an unfamiliar GPS location, there is one data collection step to help effectuate effective emergency response if needed later: identifying the room or apartment number and floor where the encounter is taking or will take place in the future. If GPS location matches a location in the database that has been previously identified and disambiguated, particularly if the encounter involves partners who were previously and are still linked, the room or apartment information will prefill with the matching GPS, floor, room location, gate/entry codes, or instructions from a previous location registration or encounter. If there is no GPS match or there is any reason to believe that the location of the encounter is unclear or poorly specified, the system will ask the user to help in disambiguating the device(s)' GPS signal (latitude, longitude, and very rough imprecise altitude) with a floor and room number, and any gate code or barrier password or passcode information and any guidance that needs to be shared privately and conditionally with emergency services in an emergency, to facilitate and direct any necessary intervention that may be necessary to guide a human being as autonomously as possible to the correct entrance door or room if an emergency arises. This step can be optionally deferred to the time of an emergency if users initiate and agree on rushed Quick Consent instead of Healthy/Safe Consent, but doing so is not recommended as it makes emergency service response harder.

In step 393, monitoring starts, employing advanced features of the consent monitoring module. These features include real-time analysis of verbal commands using a natural language processing engine, biometric distress signal detection, and tracking of environmental factors such as noise levels. The server dynamically updates the consent score throughout the interaction, providing a higher degree of oversight and accountability compared to Quick Consent Mode. The Safe/Healthy Consent Mode prioritizes thorough preparation and robust monitoring, offering users an enhanced level of security and reassurance.

By providing customizable consent modes, the process depicted in FIG. 3C enhances the flexibility and user-friendliness of the consent management system. The Quick Consent Mode offers a streamlined experience with essential safeguards, while the Safe/Healthy Consent Mode delivers a more comprehensive approach with detailed preparation and advanced monitoring.

There is also a Private Practice mode. In this mode, users can experiment and play with the system without sending consent records or emergency support requests through the network 106, and unless they switch to another mode nearly all data will be processed on their devices 112 or 114 with the help of a database and scoring system local to their devices. Very minimal data may be shared with the server 106 to signal for tracking purposes that Private Practice mode has been engaged without related consent records or emergency support calls. In Private Practice users will be able to practice-drill while their privacy is maximally protected. Private Practice can not only be used for new user orientation and periodic practice-drills but can also be used by exceptionally privacy-conscious users who want locally monitored and device-supported sexual experience safety, grading, and device refereeing but don't, for whatever reason, trust this system's network privacy or off-device cryptography and do not want us to send data on their behalf to the network 106 or server 102 or any emergency partners with consent, relationship, and sexual health information they consider too private and sensitive to share for non-local processing or storage.

Figure 4:
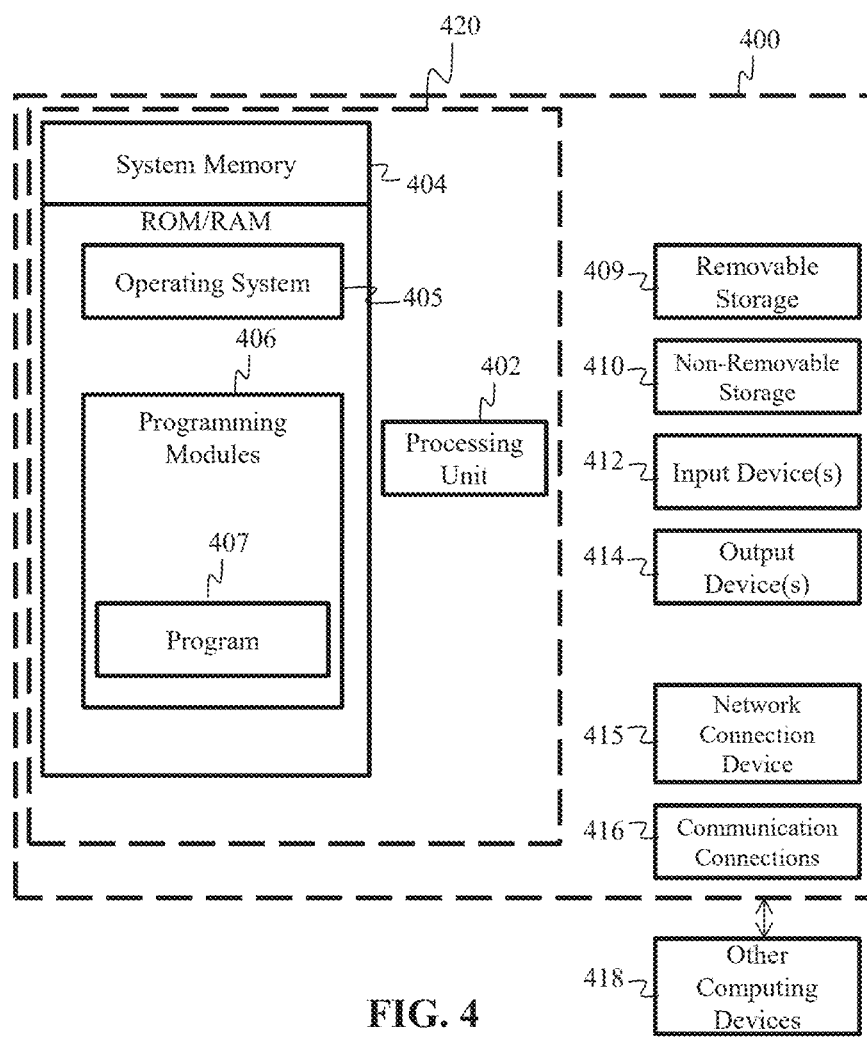
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 112, 114, 160, 170, 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and processes 300, 350, 375, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g., random-access memory (RAM)), non-volatile (e.g., read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 112, 114, 160, 170, 102. Furthermore, embodiments may be practiced in conjunction with a graphics library, other operating systems, or any other application program and are not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable, and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as bedside input consent/dissent/SOS buttons, a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter, or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g., program module 407) may perform processes including, for example, one or more of the stages of the processes 300, 350, 373 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including hand-held devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages, and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A consent management system for facilitating sexual interactions, the consent management system comprising a web server application executing on a web server configured to communicate with a first and a second user device via a connected communications network, the web server application comprising:
    a consent scoring module configured to receive and process data from the first and second user devices via the communications network, including responses from the first and second user devices to a pre-interaction checklist, real-time verbal commands detected on the first and second user devices, and post-interaction feedback submitted via the first and second user devices, the consent scoring module further configured to calculate a dynamic consent score based on the received data, update the consent score continuously, and transmit instructions to the first and second user devices via the communications network to adjust system behavior during and after interactions;
    a consent monitoring module configured to receive real-time verbal command data from the first and second user devices via the communications network, process the data to detect predefined stop words and go words, and transmit dynamic feedback instructions to the first and second user devices via the communications network to affirm ongoing consent or signal cessation of consent;
    a communications link comprising a connection between the web server application and an emergency dispatch center via the communications network, wherein the communications link is configured to maintain a connection to the emergency dispatch center to enable immediate data transmission;
    an emergency response mechanism configured to receive biometric distress signals and stop word data from the first and second user devices via the communications network, and upon detection of an emergency, initiate a call to the emergency dispatch center via the connection, and transmit relevant emergency information, including geolocation data and incident details, to the emergency dispatch center through the connection to facilitate a timely and measured response; and
    a cryptographic storage module configured to generate and store tamper-resistant records of consent-related data, including pre-interaction checklist responses, real-time verbal commands, and post-interaction feedback, using cryptographic hashing to ensure data integrity and confidentiality.

2. The system of claim 1, wherein the consent scoring module applies a machine learning algorithm to analyze historical user data and refine the consent score calculation by dynamically weighting inputs from the pre-interaction checklist, real-time verbal commands, and post-interaction feedback.

3. The system of claim 2, wherein the consent monitoring module is further configured to provide audio or visual alerts on the first and second user devices to notify users of consent status changes or violations detected during real-time interactions.

4. The system of claim 3, wherein the consent monitoring module incorporates a context-aware natural language processing engine configured to differentiate verbal commands related to consent from ambient speech, and further configured to identify, tag, and associate each verbal command with the specific user who issued it, thereby reducing false-negative and false-positive detections.

5. The system of claim 4, wherein the emergency response mechanism is further configured to transmit user-defined emergency contact preferences stored in the system to the emergency dispatch center through the connection.

6. The system of claim 5, wherein the emergency response mechanism includes a fallback mechanism to send emergency alerts via webhooks or API calls to predefined contacts or services if the connection to the emergency dispatch center fails.

7. The system of claim 5, wherein the cryptographic storage module is further configured to generate a tamper-proof audit log by appending sequentially timestamped cryptographic hashes of all relevant consent-related data.

8. A consent management system for facilitating sexual interactions, the consent management system comprising a web server application executing on a web server configured to communicate with a first and a second user device via a connected communications network, the web server application comprising:
    a biometric authentication module configured to receive and process biometric data from the first and second user devices to confirm the identity and voluntary engagement of each user, link the first and second user devices, and generate a secure record of initial consent that is cryptographically verifiable and tamper-resistant;
    a consent scoring module configured to receive and process data from the first and second user devices via the communications network, including responses from the first and second user devices to a pre-interaction checklist, real-time verbal commands detected on the first and second user devices, and post-interaction feedback submitted via the first and second user devices, the consent scoring module further configured to calculate a dynamic consent score based on the received data, update the consent score continuously, and transmit instructions to the first and second user devices via the communications network to adjust system behavior during and after interactions;

a consent monitoring module configured to receive real-time verbal command data from the first and second user devices via the communications network, process the data to detect predefined stop words and go words, and transmit dynamic feedback instructions to the first and second user devices via the communications network to affirm ongoing consent or signal cessation of consent;

a communications link provided by a third-party service accessible via the communications network, the communications link comprising a continuously active socket connection to an emergency dispatch center via the communications network, wherein the communications link is configured to maintain an open and persistent connection to the emergency dispatch center to enable immediate data transmission;

an emergency response mechanism configured to receive biometric distress signals and stop word data from the first and second user devices via the communications network, and upon detection of an emergency, initiate a call to the emergency dispatch center via the connection, and transmit relevant emergency information, including geolocation data and incident details, to the emergency dispatch center through the connection to facilitate a timely and measured response; and a cryptographic storage module configured to generate and store tamper-resistant records of consent-related data, including pre-interaction checklist responses, real-time verbal commands, and post-interaction feedback, using cryptographic hashing to ensure data integrity and confidentiality.

9. The system of claim 8, wherein the consent scoring module applies a machine learning algorithm to analyze historical user data and refine the consent score calculation by dynamically weighting inputs from the pre-interaction checklist, real-time verbal commands, and post-interaction feedback.

10. The system of claim 9, wherein the consent monitoring module is further configured to visual alerts on a lighting device connected to the first and second user devices to notify users of consent status changes or violations detected during real-time interactions.

11. The system of claim 10, wherein the consent monitoring module incorporates a context-aware natural language processing engine configured to differentiate verbal commands related to consent from ambient speech, and further configured to identify, tag, and associate each verbal command with the specific user who issued it, thereby reducing false-negative and false-positive detections.

12. The system of claim 11, wherein the emergency response mechanism is further configured to transmit user-defined emergency contact preferences stored in the system to the emergency dispatch center through the connection.

13. The system of claim 12, wherein the emergency response mechanism includes a fallback mechanism to send emergency alerts via SMS, email, or push notifications to predefined contacts or services if the connection to the emergency dispatch center fails.

14. The system of claim 13, wherein the cryptographic storage module is further configured to generate a tamper-proof audit log by appending sequentially timestamped cryptographic hashes of all relevant consent-related data.

15. A consent management system for facilitating sexual interactions, the consent management system comprising a web server application executing on a web server configured to communicate with a first and a second user device via a connected communications network, the web server application comprising:

a biometric authentication module configured to receive and process biometric data from the first and second user devices to confirm the identity and voluntary engagement of each user, link the first and second user devices, and generate a secure record of initial consent that is cryptographically verifiable and tamper-resistant;

a consent customization module configured to receive user input from the first and second user devices to select consent interaction modes, including a quick consent mode, a healthy consent mode, and a private practice mode, the consent customization module further configured to adjust the functionality and data collection of the system based on the selected mode and transmit corresponding instructions to the first and second user devices;

a consent scoring module configured to receive and process data from the first and second user devices via the communications network, including responses from the first and second user devices to a pre-interaction checklist, real-time verbal commands detected on the first and second user devices, and post-interaction feedback submitted via the first and second user devices, the consent scoring module further configured to calculate a dynamic consent score based on the received data, update the consent score continuously, and transmit instructions to the first and second user devices via the communications network to adjust system behavior during and after interactions;

a consent monitoring module configured to receive real-time verbal command data from the first and second user devices via the communications network, process the data to detect predefined stop words and go words, and transmit dynamic feedback instructions to the first and second user devices via the communications network to affirm ongoing consent or signal cessation of consent;

a communications link comprising a continuously active socket connection between the web server application and an emergency dispatch center via the communications network, wherein the communications link is configured to maintain an open and persistent connection to the emergency dispatch center to enable immediate data transmission;

an emergency response mechanism configured to receive biometric distress signals and stop word data from the first and second user devices via the communications network, and upon detection of an emergency, initiate a call to the emergency dispatch center via the connection, and transmit relevant emergency information, including geolocation data and incident details, to the emergency dispatch center through the connection to facilitate a timely and measured response; and a cryptographic storage module configured to generate and store tamper-resistant records of consent-related data, including pre-interaction checklist responses, real-time verbal commands, and post-interaction feedback, using cryptographic hashing to ensure data integrity and confidentiality.

16. The system of claim 15, wherein the consent scoring module applies a machine learning algorithm to analyze historical user data and refine the consent score calculation by dynamically weighting inputs from the pre-interaction checklist, real-time verbal commands, and post-interaction feedback.

17. The system of claim 16, wherein the consent monitoring module is further configured to provide audio or visual alerts on the first and second user devices to notify users of consent status changes or violations detected during real-time interactions.

18. The system of claim 17, wherein the consent monitoring module incorporates a context-aware natural language processing engine to differentiate verbal commands related to consent from ambient speech, thereby reducing false-negative and false-positive detections.

19. The system of claim 18, wherein the emergency response mechanism is further configured to transmit user-defined emergency contact preferences stored in the system to the emergency dispatch center through the connection.

20. The system of claim 15, wherein the consent-scoring module is further configured to: identify other users who have submitted negative post-interaction feedback regarding the same individual, provide an option for those users to connect anonymously through a secure and moderated communication platform, and facilitate mutual support and resource sharing among connected users while maintaining user privacy and data confidentiality.

\* \* \* \* \*